(12) United States Patent
Ellanti

(10) Patent No.: US 9,171,293 B2
(45) Date of Patent: Oct. 27, 2015

(54) LOCATION BASED SYSTEM WITH LOCATION-ENABLED MESSAGING AND METHOD OF OPERATION THEREOF

(75) Inventor: Manohar Ellanti, Fremont, CA (US)

(73) Assignee: TELENAV, INC., Sunnyvale, CA (US)

( * ) Notice: Subject to any disclaimer, the term of this patent is extended or adjusted under 35 U.S.C. 154(b) by 267 days.

(21) Appl. No.: 12/649,322

(22) Filed: Dec. 29, 2009

(65) Prior Publication Data

US 2011/0161432 A1    Jun. 30, 2011

(51) Int. Cl.
  *G06F 15/16*    (2006.01)
  *G06Q 10/10*    (2012.01)
(52) U.S. Cl.
  CPC ..................... *G06Q 10/109* (2013.01)
(58) Field of Classification Search
  CPC ........................................................ H04W 4/02
  USPC ................. 709/206, 219; 455/456.1
  See application file for complete search history.

(56) References Cited

U.S. PATENT DOCUMENTS

| | | | |
|---|---|---|---|
| 7,450,954 B2 * | 11/2008 | Randall | 455/456.1 |
| 7,554,934 B2 | 6/2009 | Abraham et al. | |
| 2004/0087273 A1 | 5/2004 | Perttila et al. | |
| 2005/0003831 A1 | 1/2005 | Anderson | |
| 2005/0143097 A1 * | 6/2005 | Wilson et al. | 455/456.3 |
| 2006/0035646 A1 | 2/2006 | Fox et al. | |
| 2006/0291629 A1 | 12/2006 | Esh et al. | |
| 2007/0260741 A1 * | 11/2007 | Bezancon | 709/230 |
| 2007/0264969 A1 * | 11/2007 | Frank et al. | 455/404.2 |
| 2008/0153510 A1 | 6/2008 | Sulander et al. | |
| 2009/0005076 A1 * | 1/2009 | Forstall et al. | 455/456.2 |
| 2009/0132070 A1 | 5/2009 | Ebrom et al. | |
| 2010/0113066 A1 * | 5/2010 | Dingler et al. | 455/456.3 |
| 2010/0159887 A1 * | 6/2010 | Lewis | 455/412.2 |
| 2011/0054776 A1 * | 3/2011 | Petrov et al. | 701/201 |

OTHER PUBLICATIONS

International Search Report for Application No. PCT/US2010/061663 dated Feb. 24, 2011.

* cited by examiner

*Primary Examiner* — Glenford Madamba
(74) *Attorney, Agent, or Firm* — IP Investment Law Firm

(57) ABSTRACT

A method of operation of a location based system includes: submitting a tagged message having a message content, a trigger, and a recipient identifier; determining a location reading for locating a recipient associated with the recipient identifier; determining a temporal reading associated with the recipient identifier; and displaying the message content on a device having the recipient identifier, the message content displayed based on the trigger with the location reading, the temporal reading, or a combination thereof.

20 Claims, 9 Drawing Sheets

LOCATION BASED SYSTEM WITH LOCATION-ENABLED MESSAGING AND METHOD OF OPERATION THEREOF

TECHNICAL FIELD

The present invention relates generally to a location based system, and more particularly to a system for a location based system with location based service.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location based service devices, new and old usage begin to take advantage of this new device space. There are many solutions to take advantage of this new device opportunity. One existing approach is to use location information to provide location based services, such as a global positioning service (GPS) location based system for a mobile device. Solutions include capabilities such as point-to-point route selection, turn-by-turn navigation guidance, and provision of point of interest information.

In response to consumer demand, location based systems are providing ever-increasing amounts of information requiring these systems to handle more and more data. This information includes map data, business data, local weather, and local driving conditions. The demand also exists to provide organization or filtering of location based information. The demand for more information and the need to remain current continue to challenge the providers of location based systems.

Thus, a need remains for a location based system to provide organization or filtering of location based information. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a location based system including: submitting a tagged message having a message content, a trigger, and a recipient identifier; determining a location reading for locating a recipient associated with the recipient identifier; determining a temporal reading associated with the recipient identifier; and displaying the message content on a device having the recipient identifier, the message content displayed based on the trigger with the location reading, the temporal reading, or a combination thereof.

The present invention provides a location based system including: a control unit coupled to a storage unit and a user interface for submitting a tagged message having a message content, a trigger, and a recipient identifier; a location unit for determining a location reading for locating a recipient associated with the recipient identifier; a check trigger module for determining a temporal reading associated with the recipient identifier; and a message management module for displaying the message content on a device having the recipient identifier, the message content displayed based on the trigger with the location reading, the temporal reading, or a combination thereof.

Certain embodiments of the invention have other steps or elements in addition to or in place of those mentioned above. The steps or elements can become apparent to those skilled in the art from a reading of the following detailed description when taken with reference to the accompanying drawings.

BEST MODE FOR CARRYING OUT THE INVENTION

Figure 1:
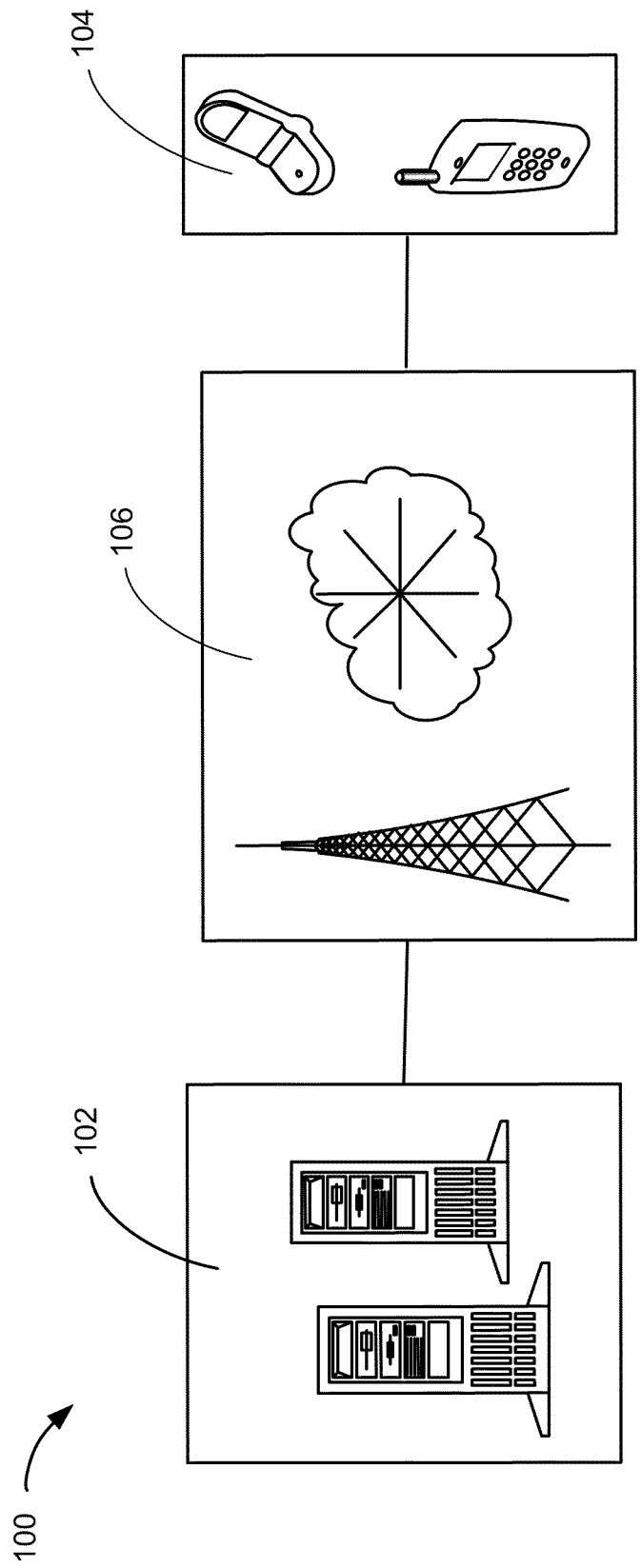
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user. The navigation information is presented by longitude and latitude related information.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is shown an example of an environment 100 using an embodiment of the present invention. The environment 100 applies to any embodiment of the present invention described later. The environment 100 includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment device having means for coupling to the communication path 106.

The communication path 106 can be a variety of networks. For example, the communication path 106 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
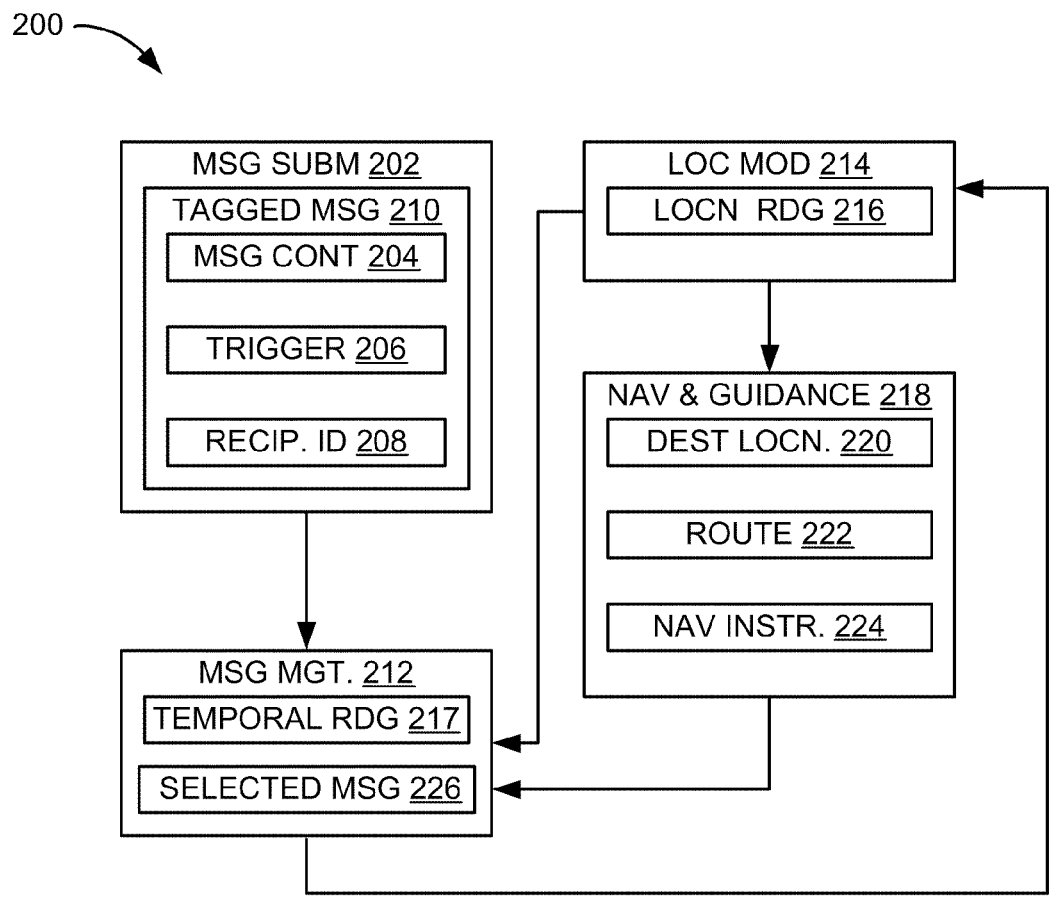
FIG. 2 is a flow chart of a location based system with location-enabled messaging in a first embodiment of the present invention.

Referring now to FIG. 2, therein is shown a flow chart of a location based system 200 with location-enabled messaging in a first embodiment of the present invention. The location based system 200 can be implemented in the first device 102 of FIG. 1, the second device 104 of FIG. 1, or partitioned between the first device 102 and the second device 104.

A message submission module 202 can submit a tagged message 210. For the present invention, the tagged message 210 can be defined as information which includes a message, an intended recipient for the message, and a condition. The location based system 200 can operate on the tagged message 210 to display or present the message to the intended recipient on a device with the location based system 200, such as the second device 104, when the condition is met or satisfied. Displaying the message on a device can include presenting a visual message, playing an audio message, or a combination thereof. Displaying the messaging can be operated on an output device such as a multimedia display, a projector, a video screen, a speaker, or any combination thereof.

Also, for the present invention, submitting the tagged message 210 can include adding the tagged message 210 for the use of the functions and modules of the location based system 200. The tagged message 210 can be submitted by way of an interface on a device with the location based system 200 such as the first device 102 or the second device 104.

The tagged message 210 can include a message content 204. The message submission module 202 can submit the message content 204 as part of the tagged message 210. The message content 204 can be the informational portion of the tagged message 210. Submitting the message content 204 can mean that the message content 204 can be added with the tagged message 210 for the use of the functions and modules of the location based system 200. The message content 204 can be submitted with the tagged message 210 by way of an interface on a device with the location based system 200 such as the first device 102 or the second device 104.

The message content 204 can be a variety of different formats. For example, the message content 204 can be a text message, an audio clip, a video clip, a photograph, or any combination thereof. The message content 204 can also include an image of a web page, or a link to a website, which can include streaming video, streaming audio, text, graphics, or any combination thereof. The message content 204 can be personal, such as a user-to-user message. As an example, the message content 204 can include a text message to a recipient from a sender known to the recipient with a personal message or request. As a further example, the message content 204 can be a text message, a calendar reminder, or other prearranged communication, from one to oneself.

The tagged message 210 can also include a trigger 206. The message submission module 202 can specify the trigger 206 as part of the tagged message 210. The trigger 206 can be described as the condition portion of the tagged message 210, which can apply as a prerequisite for the presentation or display of the message content 204 to the intended recipient. Specifying the trigger 206 can include a process of adding the trigger 206 with the tagged message 210 for the use of the functions and modules of the location based system 200. The trigger 206 can be specified with the tagged message 210 by way of an interface on a device with the location based system 200 such as the first device 102 or the second device 104.

As an example, the trigger 206 can include a condition of crossing a navigation boundary or geofence. The navigation boundary can be a geographic region determined by a location positioning mechanism, such as a GPS. The navigation boundary as a component of the trigger 206 can represent a street segment, proximity to a point of interest, an identified city block, a shopping mall, a parking lot, or a residential address. The conditions of the trigger 206 can be met or satisfied if the location based system 200 is determined to traverse the navigation boundary or geofence.

The trigger 206 can be specified as traversal into or out of an area, such as entering or leaving a parking lot. The trigger 206 can include more than one condition. For example, the trigger 206 can include a condition that a recipient is within a radius of a location for a minimum period of time.

The trigger 206 can also specify a one-time-only condition, such as a calendar reminder. If the message content 204 of a one-time-only condition is presented one time, then it can be blocked from further presentation, even if the conditions of the trigger 206 are met again.

The tagged message 210 can also include a recipient identifier 208. The message submission module 202 can assign the recipient identifier 208 associated with the message content 204 and the trigger 206 as part of the tagged message 210. The recipient identifier 208 can be the portion of the tagged message 210 which can identify the intended recipient of the message content 204. Assigning the recipient identifier 208 can include adding the recipient identifier 208 with the tagged message 210 for the use of the functions and modules of the location based system 200. The recipient identifier 208 can be specified with the tagged message 210 by way of an interface on a device with the location based system 200 such as the first device 102 or the second device 104.

The recipient identifier 208 can identify the intended recipient of the message content 204. For example, the recipient identifier 208 can include a cell-phone number, an email address, an internet protocol (IP) address or other identification of a device with the intended recipient. The recipient identifier 208 can also include a list of cell-phone numbers, email addresses, or IP addresses to denote multiple intended recipients.

As an example, a user may want to make a request to a family member to buy an item at a local store the next time the family member is near the store. The user can submit the tagged message 210 having the message content 204, the trigger 206, and the recipient identifier 208, to the location based system 200. The message content 204 can be submitted as a text request asking the family member to buy the item. The trigger 206 can be specified to require that the recipient should be within a city block of the store. The recipient identifier 208 can be assigned with a cell phone number of the family member, the cell phone being a device with the location based system 200.

In this example, the user can submit the tagged message 210, including submitting the message content 204 as the text request, specifying the trigger 206 as a proximity to the store, and assigning the recipient identifier 208 as the family member. The user can submit the tagged message 210 to the location based system 200 from a desktop PC, a notebook PC, a cell phone, or another device with the location based system 200. When the location of the family member's cell phone is within a city block of the store, the message content 204 can be displayed or presented on the family member's cell phone, or other device such as the second device 104.

As a further example, the location based system 200 can operate as a reminder or calendar manager. In this example, one preferably provides the tagged message 210 to oneself. In this example, the recipient identifier 208 can be assigned as the device through which the tagged message 210 was submitted, and the message content 204 can be presented on the same device.

Also, the recipient identifier 208 can include multiple intended recipients, and the trigger 206 and the recipient identifier 208 can be implemented in a variety of ways. For example, the tagged message 210 can be submitted such that if any of a number of devices included with the recipient identifier 208 meets the condition specified in the trigger 206, then the message content 204 can be presented on a selected device. As a variation, the tagged message 210 can be submitted such that the message content 204 is presented on all devices of the recipient identifier 208 when one of the devices meets the conditions of the trigger 206.

As a further example, the trigger 206 can be specified and the recipient identifier 208 can be assigned such that the system can send a "who's first" message. That is, the conditions specified in the trigger 206 can be met by one of a number of devices with the location based system 200, and the message content 204 can be displayed on a number of devices identifying the triggering device. An application of this feature can be a group of vacationers traveling in a number of cars who can set the location based system 200 such that a message is sent to all members of the group when the first vehicle in the group arrives at a prearranged destination.

The message submission module 202 can also store the tagged message 210 with the message content 204, the trigger 206, and the recipient identifier 208. The message submission module 202 can send the tagged message 210 to a message management module 212.

A location module 214 can determine a location reading 216 for locating a recipient associated with the recipient identifier 208. For the present invention, the location reading 216 can be a sampled geographic location of a device, which is associated with the recipient identifier 208. For example, the location reading 216 can be the sampled location of the second device 104, having the recipient identifier 208, presumed to be in the possession of the intended recipient.

Determining the location reading 216 can include sampling a location of a device from a positioning system, for example, a GPS. The location module 214 can determine the location reading 216 to locate the device associated with the recipient identifier 208. The location reading 216 associated with the recipient identifier 208 can be used by the location based system 200 to determine whether a location condition of the trigger 206 is met.

A navigation guidance module 218 can receive the location reading 216 from the location module 214. The navigation guidance module 218 can also receive a destination location 220. The navigation guidance module 218 can select a route 222 from the location reading 216 to the destination location 220, and can generate a navigation instruction 224 based on the location reading 216 and the route 222. The navigation guidance module 218 can send the route 222 to the message management module 212.

The message management module 212 can receive the tagged message 210 with the message content 204, the trigger 206, and the recipient identifier 208, from the message submission module 202. The message management module 212 can also receive the location reading 216 from the location module 214, and the route 222 from the navigation guidance module 218.

The message management module 212 can also select a selected message 226. The selected message 226 can be a message such as the tagged message 210, which has met the condition included with the trigger 206. Selecting the selected message 226 can include a process in which the location based system 200 can choose the tagged message 210 to be the selected message 226. The location based system 200 can operate on the selected message 226 to present the message content 204 to the recipient identifier 208.

For example, when the condition set by the trigger 206 is met the message management module 212 of the location based system 200 can select the tagged message 210 to be the selected message 226. The message management module 212 can present the message content 204 on a device such as the second device 104 designated by the recipient identifier 208.

The message management module 212 can select the tagged message 210 to be the selected message 226, based on the location reading 216 and the trigger 206 with a match to the recipient identifier 208. Selecting the selected message 226 can mean that the message management module 212 can compare the location reading 216, a temporal reading 217, or a combination thereof, with the trigger 206, and can decide whether the condition specified in the trigger 206 has been met. The temporal reading 217 can preferably include a time of day, a date, or another temporal measurement. If the condition specified in the trigger 206 has been met, the message management module 212 can select the tagged message 210 to be the selected message 226.

The message management module 212 can also display the message content 204 on a device having the recipient identifier 208, the message content 204 displayed based on the trigger 206 with the location reading 216, the temporal reading 217, or a combination thereof. The message management module 212 can present the message content 204 on a display of the location based system 200. The flow control of the location based system 200 can return from the message management module 212 to the location module 214.

Comparing the location reading 216 with the trigger 206 can be a process of determining whether the location reading 216 can meet or satisfy a location requirement of the trigger 206. For example, the trigger 206 can require a device with the location based system 200 to be within a city block of a particular location. The message management module 212 can receive the location reading 216 from the location module 214 and can receive the tagged message 210 from the message submission module 202. The message management module 212 can determine whether the condition set by the trigger 206 has been met by the location reading 216.

The navigation guidance module 218 can receive map data (not shown), and can select the route 222 from the location reading 216 to the destination location 220 using information from the map data. The navigation guidance module 218 can send the route 222 to the message management module 212.

The navigation guidance module 218 can also generate the navigation instruction 224 based on the location reading 216 and the route 222. As an example, the navigation instruction 224 can be a turn-by-turn instruction for the location based system 200 as it traverses the route 222. The location based system 200 can display the navigation instruction 224 on a display of the location based system 200.

The physical transformation of the location reading 216 and the tagged message 210 results in movement in the physical world, such as people using the location based system 200 or vehicles, based on the operation of the location based system 200. As the movement in the physical world occurs, the movement itself creates additional information that is converted back to the location reading 216 for the continued operation of the location based system 200 and to continue the movement in the physical world.

Figure 3:
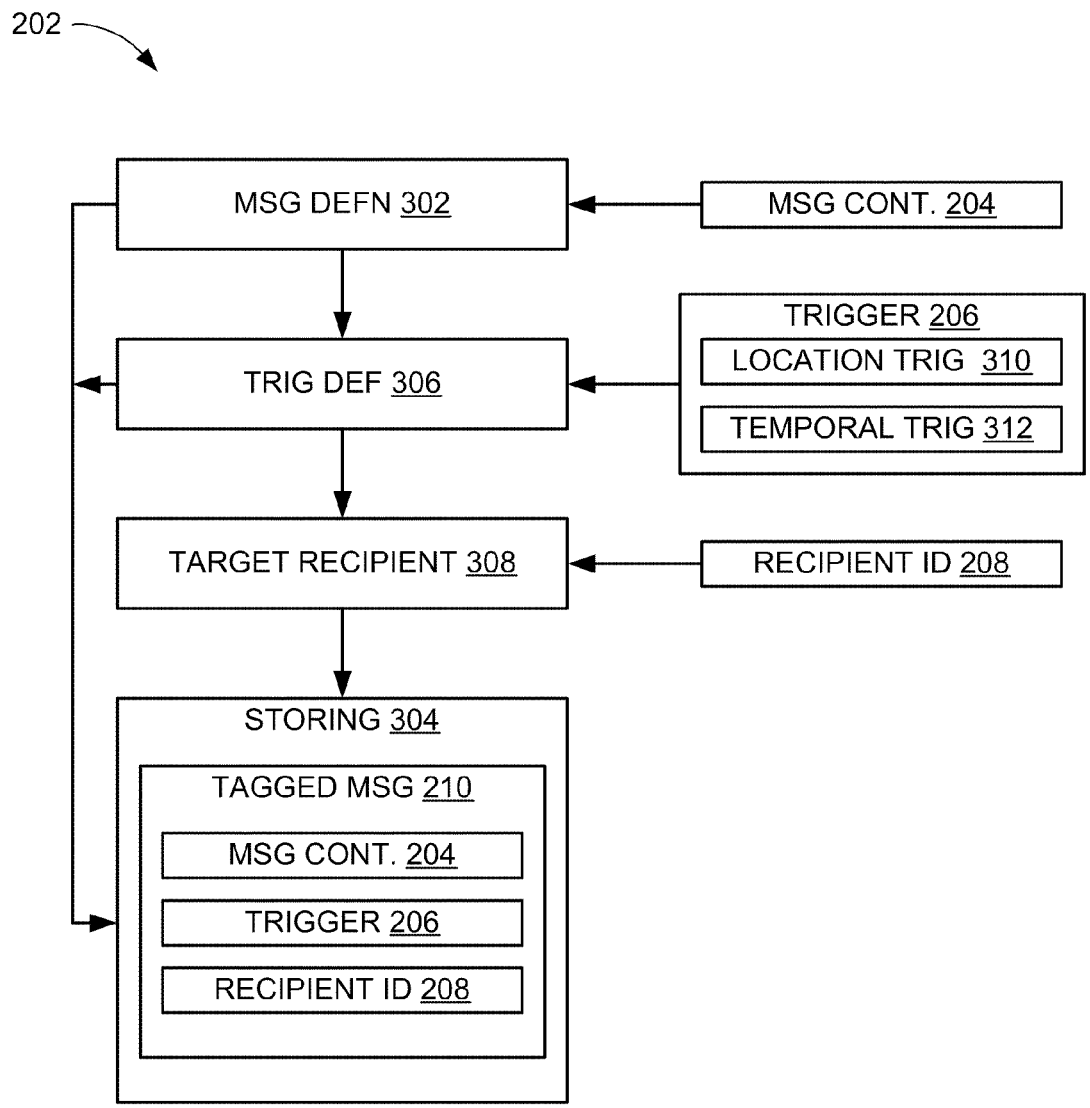
FIG. 3 is a flow chart of the message submission module of FIG. 2.

Referring now to FIG. 3, therein is shown a flow chart of the message submission module 202 of FIG. 2. A message definition module 302 can send the message content 204 to a storage module 304. The message definition module 302 can go to a trigger definition module 306.

The trigger definition module 306 can specify the trigger 206 and send the trigger 206 to the storage module 304. The trigger definition module 306 can go to a target recipient module 308. The target recipient module 308 can assign the recipient identifier 208, and can send the recipient identifier 208 to the storage module 304. The storage module 304 can store the message content 204, the trigger 206, and the recipient identifier 208 in the tagged message 210.

The message definition module 302 can receive the message content 204. The message content 204 can be presented on a device such as the first device 102 of FIG. 1 or the second device 104 of FIG. 1, for a target recipient identified by the recipient identifier 208.

The trigger definition module 306 can also receive the trigger 206. The tagged message 210 can be submitted with the trigger 206 specified having a location trigger 310 including a location-related condition of a device with the location based system 200 associated with the recipient identifier 208. The tagged message 210 can also be submitted with the trigger 206 specified having a temporal trigger 312 including a time-related condition of a device with the location based system 200 associated with the recipient identifier 208.

The location trigger 310 can be included with the trigger 206 to enable location-enabled messaging in the location based system 200. For example, a condition specified in the location trigger 310 can include traversal of a navigation boundary by a device, a location on a given thoroughfare, or proximity to a given location. A further example of a condition specified in the location trigger 310 can include traversal along a generated route, such as the route 222 of FIG. 2. The location based system 200 can determine whether a device, such as the second device 104 of FIG. 1, associated with the recipient and the recipient identifier 208, meets the condition of the location trigger 310 for the purpose of presenting the message content 204.

The trigger 206 can also include the temporal trigger 312. For example, the trigger 206 can require that the device with the location based system 200 be inside a navigation boundary for a minimum required time, following which the condition specified in the trigger 206 can be met. As a further example of the temporal trigger 312, the trigger 206 can include a time window during which the trigger 206 can be applied.

The temporal trigger 312 can specify a temporal condition of the location based system 200 of FIG. 2. As an example, the trigger 206 can include the temporal trigger 312, such that the message content 204 can be presented at a predetermined time of day, as in a calendar reminder, without requiring a location condition such as the location trigger 310.

The target recipient module 308 can assign the recipient identifier 208 associated with a recipient based on a personal familiarity with the recipient. Assigning the recipient identifier 208 based on a personal familiarity with the recipient can include assigning the recipient identifier 208 of the recipient who is personally known to the user, and whom the recipient can entrust with the recipient identifier 208. The recipient identifier 208 for any recipient can be privately known such that only selected friends or relatives can send a message to the recipient identifier 208. The user can assign the recipient identifier 208 as an individual recipient, or more than one recipient.

A consumer with a device with the location based system 200 can restrict the distribution of any identifier associated with the consumer, such as the recipient identifier 208. The location based system 200 can display the message content 204 of the tagged message 210, and can select another tagged message 210 based on invalid data for the recipient identifier 208 of the tagged message 210. Selecting another tagged message 210 based on invalid data for the recipient identifier 208 can include a process in which the location based system 200 can decide not to display the message content 204 of the tagged message 210 if the recipient identifier 208 has been improperly assigned. The location based system 200 can then select another tagged message 210, with the valid recipient identifier 208.

For example, a user unknown to the recipient can submit the tagged message 210 with no recipient identifier 208, which is an example of invalid data for the recipient identifier 208. The location based system 200 can decide that the user is unknown based on the omission of the recipient identifier 208, and the tagged message 210 can remain unselected.

It has been discovered that the present invention can provide the location based system 200 with the capability to tailor a personal or private message for an identified recipient, such as a friend or family member, under conditions of time, location, direction, or a combination thereof. The message, such as the message content 204 can be displayed on the location based system 200 for the benefit of the recipient.

It has also been discovered that the location based system 200 can prevent spam, adware, virus distribution, coupons, advertising or other non-private messaging from businesses or unknown individuals. As the recipient with the recipient identifier 208 can restrict the distribution of the recipient identifier to a select number of users, so the recipient can limit the sources of the tagged message 210. Since the location based system 200 can recognize the tagged message 210 with invalid data for the recipient identifier 208, and then select another tagged message 210, the location based system 200 can impose a restriction on messaging from sources not approved by the recipient.

The physical transformation of the recipient identifier 208 results in movement in the physical world, such as people using the location based system 200 or vehicles, based on the operation of the location based system 200. As the movement in the physical world occurs, the movement itself creates additional information that is converted back to the location reading 216 for the continued operation of the location based system 200 and to continue the movement in the physical world.

The storage module 304 can receive the tagged message 210 with the message content 204, the trigger 206, and the recipient identifier 208. The tagged message 210 can include a combination of the message content 204, the trigger 206, and the recipient identifier 208, which can be associated with each other.

Figure 4:
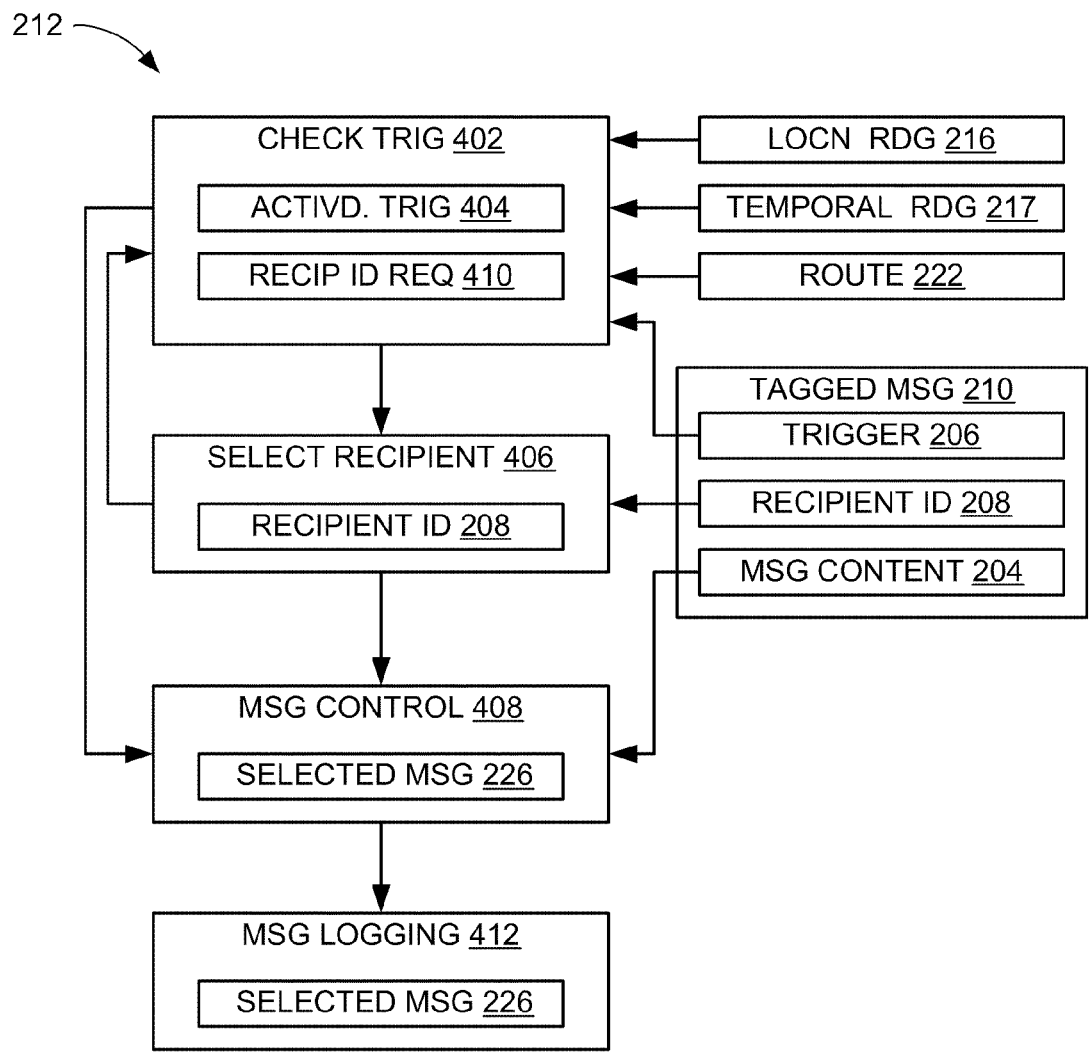
FIG. 4 is a flow chart of the message management module of FIG. 2.

Referring now to FIG. 4, therein is shown a flow chart of the message management module 212 of FIG. 2. The message management module 212 can receive the tagged message 210 having the message content 204, the trigger 206, and the recipient identifier 208. The message management module 212 can also receive the location reading 216 from the location module 214 of FIG. 2, and the route 222 from the navigation guidance module 218 of FIG. 2. The message management module 212 can select the tagged message 210 to be the selected message 226.

A check trigger module 402 can receive the trigger 206 of the tagged message 210. The check trigger module 402 can also receive the location reading 216 and the route 222. The check trigger module 402 can also determine the temporal reading 217 associated with the recipient identifier 208. The check trigger module 402 can select an activated trigger 404 based on the location reading 216, the temporal reading 217, or a combination thereof as well as the trigger 206 of the tagged message 210. The check trigger module 402 can also consider other factors, such as the route 222, when selecting the activated trigger 404.

The activated trigger 404 can be a condition, which the check trigger module 402 can determine has been met or satisfied by a device such as the second device 104 of FIG. 2. Selecting the activated trigger 404 can include the check trigger module 402 setting the trigger 206 to be the activated trigger 404 upon verification by the check trigger module 402.

The check trigger module 402 can select the activated trigger 404 by comparing the location reading 216 or the temporal reading 217 with the trigger 206 to determine if the condition of the trigger 206 has been met. If the condition of the trigger 206 has been met, then the check trigger module 402 can select the trigger 206 to be the activated trigger 404. The trigger 206 can include the location trigger 310 of FIG. 3, the temporal trigger 312 of FIG. 3, or a combination thereof.

For example, if the trigger 206 includes a condition of the location reading 216 being in a predetermined vicinity of a named location, the check trigger module 402 can compare the location reading 216 with the trigger 206. If the location reading 216 meets the condition of the trigger 206, the check trigger module 402 can select the trigger 206 to be the activated trigger 404 based on the location reading 216 and the trigger 206. The check trigger module 402 can select the activated trigger 404 to include more than one of the trigger 206 if all such conditions have been met.

The check trigger module 402 can also generate a recipient identifier request 410 based on the activated trigger 404. The recipient identifier request 410 can include a request to retrieve the recipient identifier 208 from the tagged message 210 included with the selected message 226. The check trigger module 402 can generate the recipient identifier request 410 for the purpose of identifying an intended recipient associated with the recipient identifier 208.

The check trigger module 402 can send the activated trigger 404 to a select recipient module 406. The check trigger module 402 can also send the activated trigger 404 to a message control module 408. The check trigger module 402 can also send the recipient identifier request 410 to the select recipient module 406.

The select recipient module 406 can receive the activated trigger 404 from the check trigger module 402. The select recipient module can also receive the recipient identifier request 410 from the check trigger module 402.

Upon receiving the recipient identifier request 410, the select recipient module 406 can query messages, such as the tagged message 210, for the recipient identifier 208 associated with the activated trigger 404, which can be the trigger 206. If the select recipient module 406 does not retrieve the recipient identifier 208 from the tagged message 210, then flow control of the location based system 200 can return to the check trigger module 402, where it can wait for an updated version of the location reading 216, an update version of the tagged message 210, or an updated version of the route 222.

The location based system 200 can operate selective distribution of the message content 204 to a limited number of approved users as identified with the recipient identifier 208. The location based system 200 can filter out messaging with invalid data for the recipient identifier 208, thereby preventing the distribution of non-private or unwanted messages. Such a message, with invalid data for the recipient identifier 208, can be interpreted by the location based system 200 as spam, virus, adware, or other unwanted solicitation.

If the select recipient module 406 can retrieve the recipient identifier 208 from the tagged message 210, the select recipient module 406 can send the recipient identifier 208 to the message control module 408. If the tagged message 210 does not include the recipient identifier 208, the select recipient module 406 does not send the selected message 226 to the message control module 408.

The message control module 408 can receive the recipient identifier 208 from the select recipient module 406, and the activated trigger 404 from the check trigger module 402. The message control module 408 can select the tagged message 210 associated with the activated trigger 404. Selecting the tagged message 210 associated with the activated trigger 404 can include determining the tagged message 210 associated with the activated trigger 404, which can be the trigger 206, and setting the tagged message 210 to be the selected message 226.

The purpose of the message control module 408 is to select the tagged message 210 to be the selected message 226 associated with the activated trigger 404, and to present the message content 204 of the selected message 226 on a display or output of the location based system 200. The display or output of the location based system 200 can be on a device identified by the recipient identifier 208, and preferably in the possession of the intended recipient. If the message control module 408 receives invalid data for the recipient identifier 208 from the select recipient module 406, the message management module 212 can select another tagged message 210, with the valid recipient identifier 208.

The message control module 408 can send the selected message 226 to a message logging module 412. The message logging module 412 can receive the selected message 226, and can log the message content 204, the recipient identifier 208, and the trigger 206. Logging the message content 204, the recipient identifier 208, and the trigger 206, can include storing a record of a message presented on the location based system 200 in a message log.

The message logging module 412 can retain data such as the selected message 226 with the message content 204, the recipient identifier 208, and the trigger 206, the message content 204 having been displayed on a device with the location based system 200. The message logging module 412 can also retain data such as the time the message was presented, the duration of the presentation, or the total number of messages presented over a predefined period, or other data of statistical interest.

When the message logging module 412 has logged the selected message 226, flow control of the location based system 200 can return to the location module 214 of FIG. 2. The location module 214 can determine an updated version of the location reading 216, and send the location reading 216 to the message management module 212.

The message management module 212 can operate upon receiving an updated version of the location reading 216. The message management module 212 can also operate upon receiving an updated version of the route 222 from the navigation guidance module 218. The message management module 212 can also operate upon receiving an updated version of the tagged message 210, or an additional message such as the tagged message 210.

Figure 5:
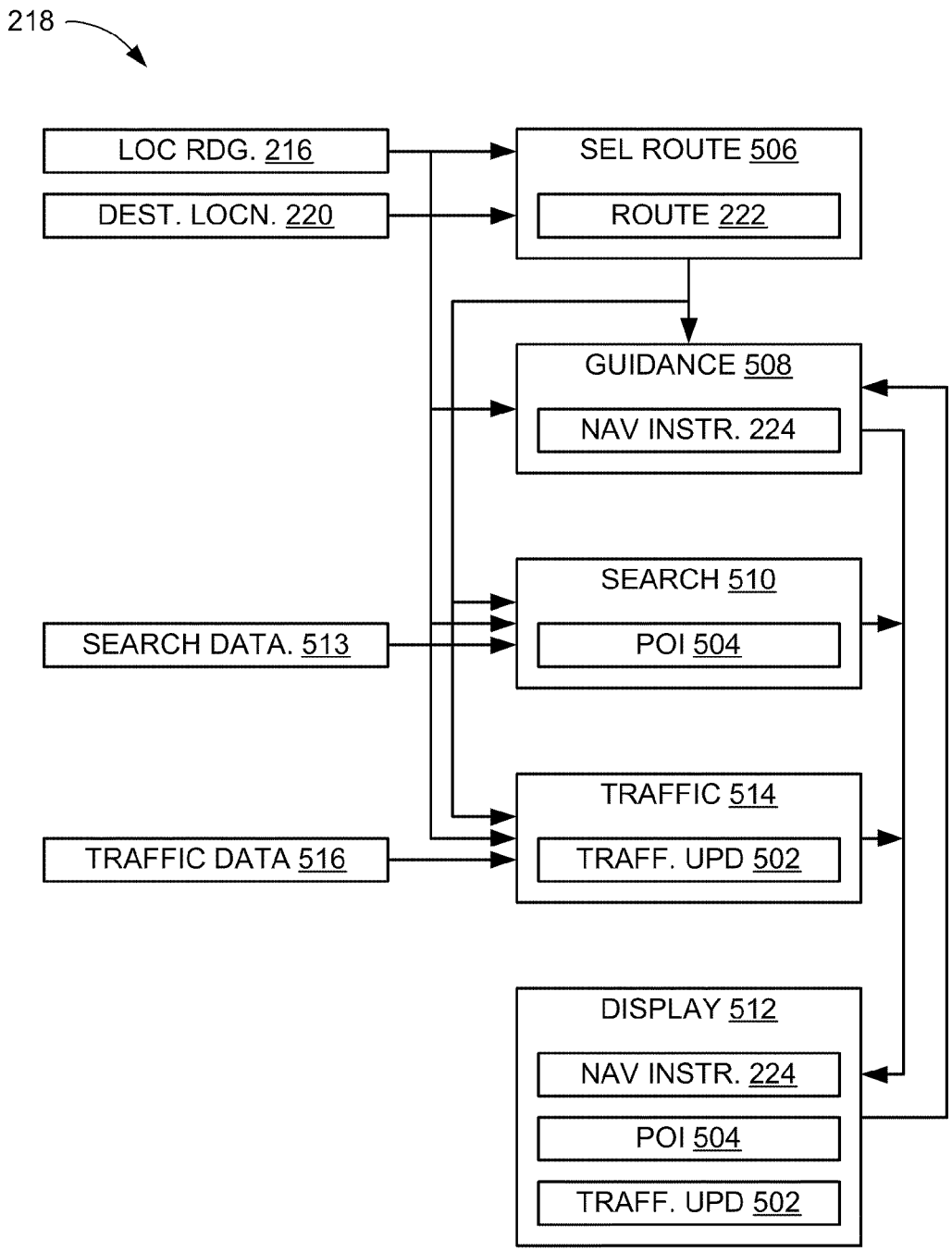
FIG. 5 is a flow chart of the navigation guidance module of FIG. 2.

Referring now to FIG. 5, therein is shown a flow chart of the navigation guidance module 218 of FIG. 2. The navigation guidance module 218 can receive the location reading 216 from the location module 214 of FIG. 2. The navigation guidance module 218 can also receive the destination location 220.

The navigation guidance module 218 can use map data (not shown) to select the route 222 from the location reading 216 to the destination location 220. The navigation guidance module 218 can also generate navigation routing information such as the navigation instruction 224. The navigation guidance module 218 can also generate other navigation routing information, such as a traffic update 502, or point of interest information 504.

A select route module 506 can receive the location reading 216 from the location module 214 of FIG. 2, and the destination location 220. The select route module 506 can select the route 222 from the location reading 216 to the destination location 220. The select route module 506 can send the route 222 to a guidance module 508.

The guidance module 508 can receive the route 222 from the select route module 506. The guidance module 508 can also receive the location reading 216 from the location module 214. The guidance module 508 can generate the navigation instruction 224 based on the location reading 216 and the route 222 for the purpose of giving guidance along the route 222. The guidance module 508 can send the navigation instruction 224 to a display module 512.

A search module 510 can receive the location reading 216 from the location module 214, and the route 222 from the select route module 506. The search module 510 can also receive search data 513. The search module 510 can generate the point of interest information 504 based on the location reading 216 and the route 222.

The point of interest information 504 can be selected from the search data 513, based on the location reading 216. For example, the search data 513 can include location information according to preferences, location history, or a combination thereof. The point of interest information 504 selected from the search data 513 can include such information in the vicinity of the location reading 216. The search data 513 can be represented as a compilation of locations of interest to a user. For example, the search data 513 can reflect a preference for particular restaurant types, or entertainment location types.

The search module 510 can select restaurants or entertainment establishments according to the preferences or previous location history reflected in the search data 513. For example, the search module 510 can sort the search data 513 according to a restaurant type. As a further example, the search module 510 can sort the search data 513 for locations previously visited, and tagged favorably by a user in the search data 513. The search data 513 can be stored for use by the location based system 200 of FIG. 2. The search module 510 can send the point of interest information 504 to the display module 512.

A traffic module 514 can receive the location reading 216 and the route 222. The traffic module 514 can also receive traffic data 516 and can generate the traffic update 502 based on the location reading 216, the route 222, and the traffic data 516.

The traffic data 516 can be an information source that can be updated in real-time. For example, the location based system 200 can travel through a metropolitan area with traffic congestion. The traffic module 514 can receive an updated version of the traffic data 516, which can reflect relevant traffic problems. The traffic data 516 can be stored for use by the location based system 200.

The traffic module 514 can recognize the traffic problems which can impact the location based system 200 based on the location reading 216 and the route 222. If the route 222 runs sufficiently close to the traffic problems, the traffic module 514 can generate the traffic update 502 with information about the traffic conditions. The traffic module 514 can send the traffic update 502 to the display module 512.

The display module 512 can receive the navigation instruction 224 from the guidance module 508. The display module 512 can also receive the point of interest information 504 from the search module 510, and the traffic update 502 from the traffic module 514. The display module 512 can present the relevant information on a display of the location based system 200.

Figure 6:
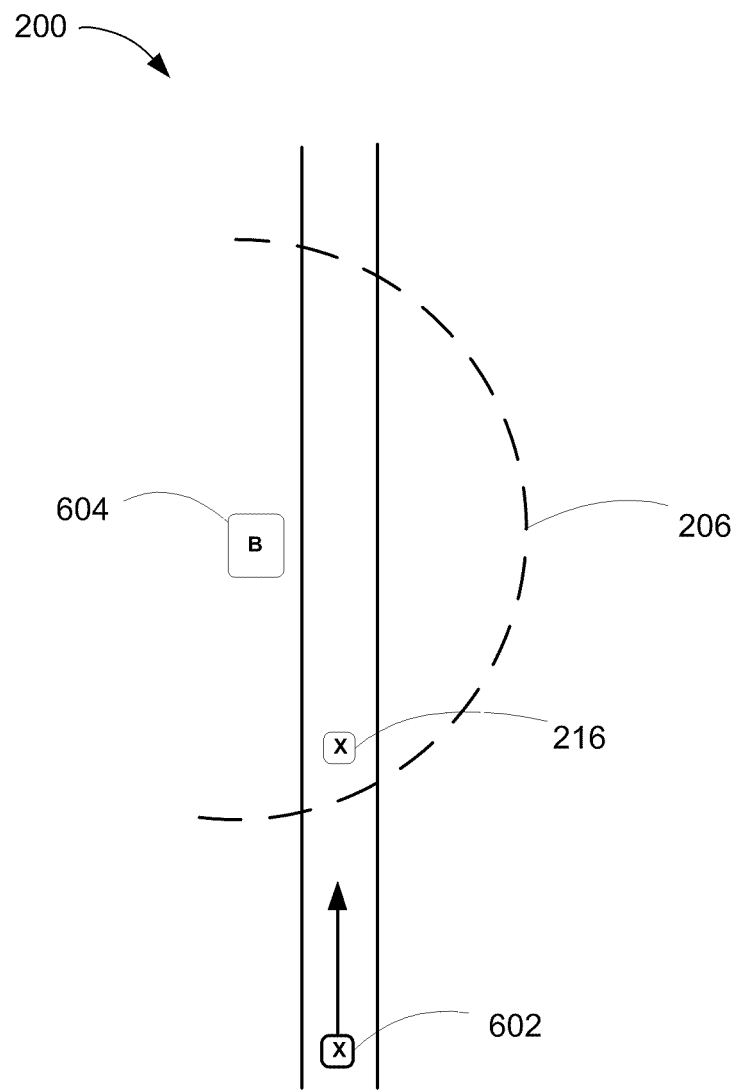
FIG. 6 is a geographic view of an example application of the location based system of FIG. 2.

Referring now to FIG. 6, therein is shown a geographic view of an example application of the location based system 200 of FIG. 2. FIG. 6 shows a diagram of a portion of the route 222 of FIG. 2, and a device 602 having the location based system 200. The device 602 can represent or can contain the first device 102 of FIG. 1 or the second device 104 of FIG. 1.

The geographic view depicts the device 602 traversing the route 222 in the direction indicated by an arrow. The view also depicts the trigger 206 in the form of a navigation boundary represented by a dotted line. The trigger 206 can be implemented such that the message management module 212 of FIG. 2 can detect a traversal of the navigation boundary by the device 602.

In this example, the trigger 206 is in the shape of an arch with a predefined radius around a location such as a supermarket 604. It is understood that the trigger 206 can be any of a variety of geometric shapes. For illustrative purposes, the trigger 206 is shown as a location condition such as the location trigger 310 of FIG. 3, although it is understood that the trigger 206 can be specified with the temporal trigger 312 of FIG. 3, the location trigger 310, or a combination thereof.

As the device 602 traverses the route 222, the message management module 212 can compare the location reading 216 with the trigger 206 of the tagged message 210 of FIG. 2. Prior to a traversal of the trigger 206, the check trigger module 402 can determine that the trigger 206 has not been activated. The flow control of the location based system 200 can remain in the check trigger module 402 of FIG. 4, and the activated trigger 404 remains unselected.

When the device 602 is at the location reading 216, representing a traversal of the trigger 206, the message management module 212 can receive the location reading 216. The message management module 212 can detect a traversal of the trigger 206, and the trigger 206 can be included with the activated trigger 404 of FIG. 4. The recipient identifier request 410 of FIG. 4 can be generated by the message management module 212.

The select recipient module 406 of FIG. 4 can identify the recipient identifier 208 of FIG. 2 associated with the activated trigger 404. The message control module 408 of FIG. 4 can select the tagged message 210 of FIG. 2 associated with the trigger 206 and the recipient identifier 208. The message control module 408 can operate a display unit of the device 602 to present the message content 204 of FIG. 2 of the selected message 226.

The message content 204 can be a personal request from one family member to another. As an example, the message content 204 can be a request to buy bread at the supermarket 604. As the device 602 traverses the trigger 206, the location based system 200 can present the message content 204 with the request.

As a further example, the trigger 206 can be augmented with the temporal trigger 312 of FIG. 3 to consider the business hours of the supermarket 604. For example, the temporal trigger 312 can specify a condition which can be applied only during the hours of operation of the supermarket 604. If the device 602 traverses the trigger 206 after the closing time of the supermarket 604, then the conditions specified in the trigger 206 are not all met, and the recipient identifier request 410 can include an instruction not to retrieve the recipient identifier 208.

It has also been discovered that the present invention provides a location based system that provides greetings and messages based on the location of an identified recipient. Friends or family members can leave a greeting or message to be presented to the recipient when the recipient meets the condition specified with the trigger 206, which can be set by a user. The user can submit a reminder for a calendar event, which can be submitted with the temporal trigger 312. The use of the trigger 206 and the recipient identifier 208 enable the use of location-enabled messaging.

Figure 7:
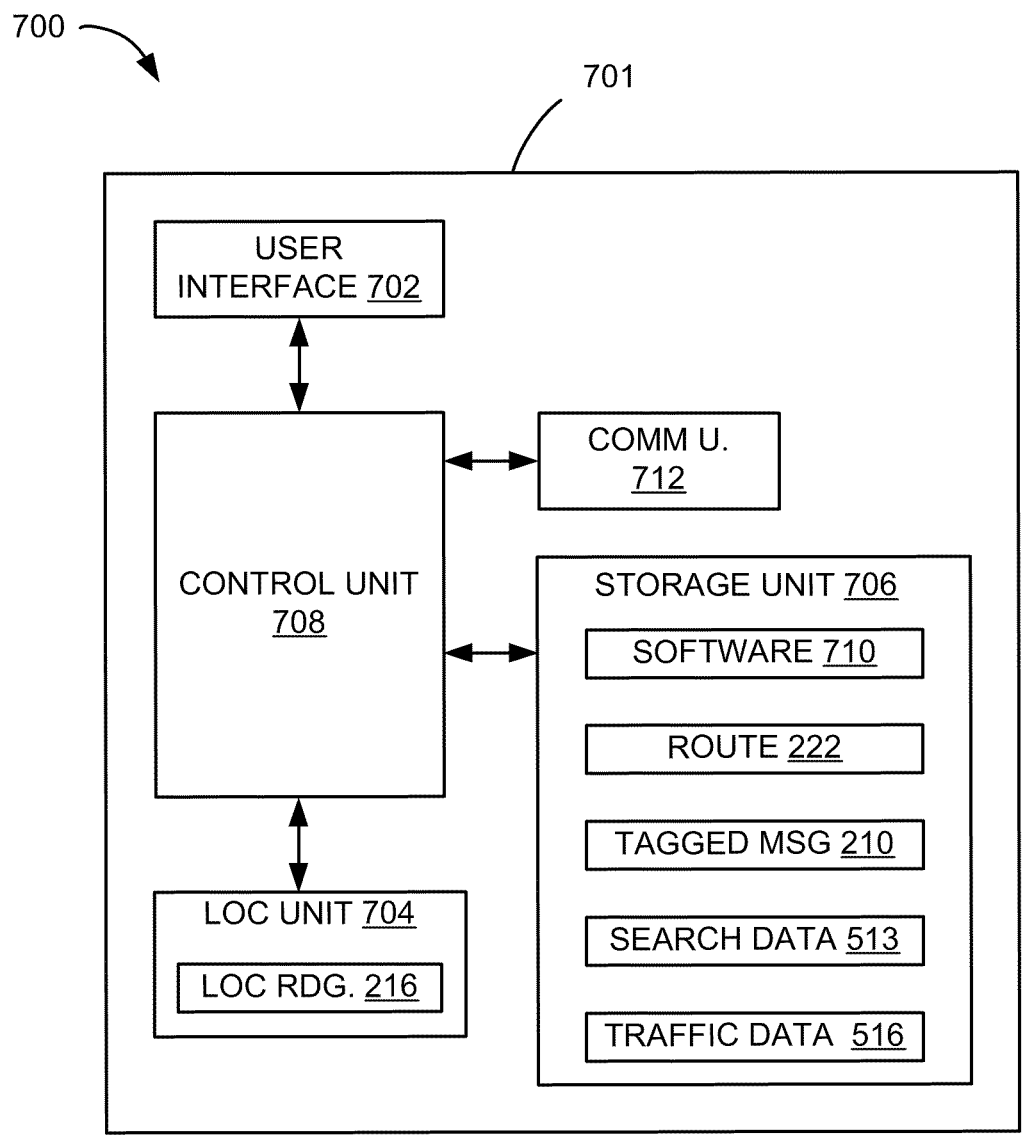
FIG. 7 is a block diagram of a location based system with location-enabled messaging in a second embodiment of the present invention.

Referring now to FIG. 7, therein is shown a block diagram of a location based system 700 with location-enabled messaging in a second embodiment of the present invention. The location based system 700 can include a device 701, which can be the second device 104 of FIG. 1. For example, the device 701 can be any of a variety of devices, such as a cellular phone, a personal digital assistant, a notebook computer, or an entertainment device. The device 701 can be a standalone device, or can be incorporated with a vehicle, for example a car, truck, bus, or train.

As a further example, the device 701 can be a particularized machine, such as a mainframe, a server, a cluster server, rack mounted server, or a blade server, or as more specific examples, an IBM System z10™ Business Class mainframe or a HP ProLiant ML™ server. The device 701 can include a user interface 702, a location unit 704, a storage unit 706, a control unit 708, such as a processor, and a communication unit 712.

The user interface 702 allows a user (not shown) to interface and interact with the device 701. The user interface 702 can include an input device and an output device. For example, the output device can include a multimedia display, a projector, a video screen, a speaker, or any combination thereof. Examples of the input device include a keypad, a touchpad, a keyboard, a microphone, or any combination thereof to provide data and communication inputs.

The control unit 708 can execute a software 710 to provide the intelligence of the location based system 700. The control unit 708 can operate the user interface to display information generated by the location based system 700. The control unit 708 can also execute the software 710 for the other functions of the location based system 200, including receiving location information from the location unit 704. The control unit 708 can further execute the software 710 for interaction with the communication path 106 of FIG. 1 via the communication unit 712.

The control unit 708 can be implemented in a number of different manners. For example, the control unit 708 can be a processor, an embedded processor, a microprocessor, a hardware control logic, a hardware finite state machine (FSM), a digital signal processor (DSP), or a combination thereof.

The location unit 704 can generate location information, current heading, and current speed of the device 701, as examples. The location unit 704 can be implemented in many ways. For example, the location unit 704 can function as at least a part of a global positioning system (GPS), an inertial navigation system, a cellular-tower location system, a pressure location system, or any combination thereof.

The communication unit 712 can enable external communication to and from the device 701. For example, the communication unit 712 can permit the device 701 to communicate with the first device 102 of FIG. 1, an attachment, such as a peripheral device or a computer desktop, and the communication path 106 of FIG. 1.

The communication unit 712 can also function as a communication hub allowing the device 701 to function as part of the communication path 106 and not limited to be an end point or terminal unit to the communication path 106. The communication unit 712 can include active and passive components, such as microelectronics or an antenna, for interaction with the communication path 106.

The storage unit 706 can store the software 710. The storage unit 706 can also store setup data, and other data, such as the tagged message 210, for the operation of the location based system 700. The storage unit 706 can also store the search data 513 for use with the search module 510 of FIG. 5. The storage unit 706 can also store the traffic data 516, for use with the traffic module 514 of FIG. 5, and the route 222 generated by the navigation guidance module 218 of FIG. 2.

The storage unit 706 can be a volatile memory, a nonvolatile memory, an internal memory, an external memory, or a combination thereof. For example, the storage unit 706 can be a nonvolatile storage, such as non-volatile random access memory (NVRAM), Flash Memory, disk storage, or a volatile storage such as static random access memory (SRAM).

For illustrative purposes, the location based system 700 is shown with the device 701 described with discrete functional modules, although it is understood that the location based system 700 can have the device 701 in a different configuration. For example, the control unit 708, the communication unit 712, and the user interface 702 may not be discrete functional modules, but can have one or more of the aforementioned modules combined into one functional module.

The functional units in the device 701 can work individually and independently of the other functional units. The device 701 can work individually and independently from other devices, such as the first device 102 and the communication path 106.

The control unit 708 can execute the software 710 and can provide the intelligence of the device 701. As an example, the software 710 can include the location based system 200 of FIG. 2, and the functional units of the device 701 can operate the modules of the location based system 200.

For example, the control unit 708 can couple to the storage unit 706 and the user interface 702 to operate the message submission module 202 of FIG. 2. In particular, the control unit 708 can couple to the user interface 702 to operate the message definition module 302 of FIG. 3, the trigger definition module 306 of FIG. 3, and the target recipient module 308 of FIG. 3. The control unit 708 can couple to the storage unit 706 to operate the storage module 304 of FIG. 3.

The control unit 708 can also couple to the storage unit 706 and the user interface 702 to operate the message management module 212 of FIG. 2. In particular, the control unit 708 can couple to the storage unit 706 to operate the check trigger module 402 of FIG. 4 and the select recipient module 406 of FIG. 4. The control unit 708 can couple to the user interface 702 to operate the message control module 408 of FIG. 4. The control unit 708 can couple to the storage unit 706 to operate the message logging module 412 of FIG. 4.

The control unit 708 can couple to the user interface 702 and the communication unit 712 to operate the navigation guidance module 218. The location unit 704 can operate the location module 214 of FIG. 2. The control unit 708 can operate the user interface 702 to display information generated by the location based system 700, or receive information for use by the location based system 700.

Figure 8:
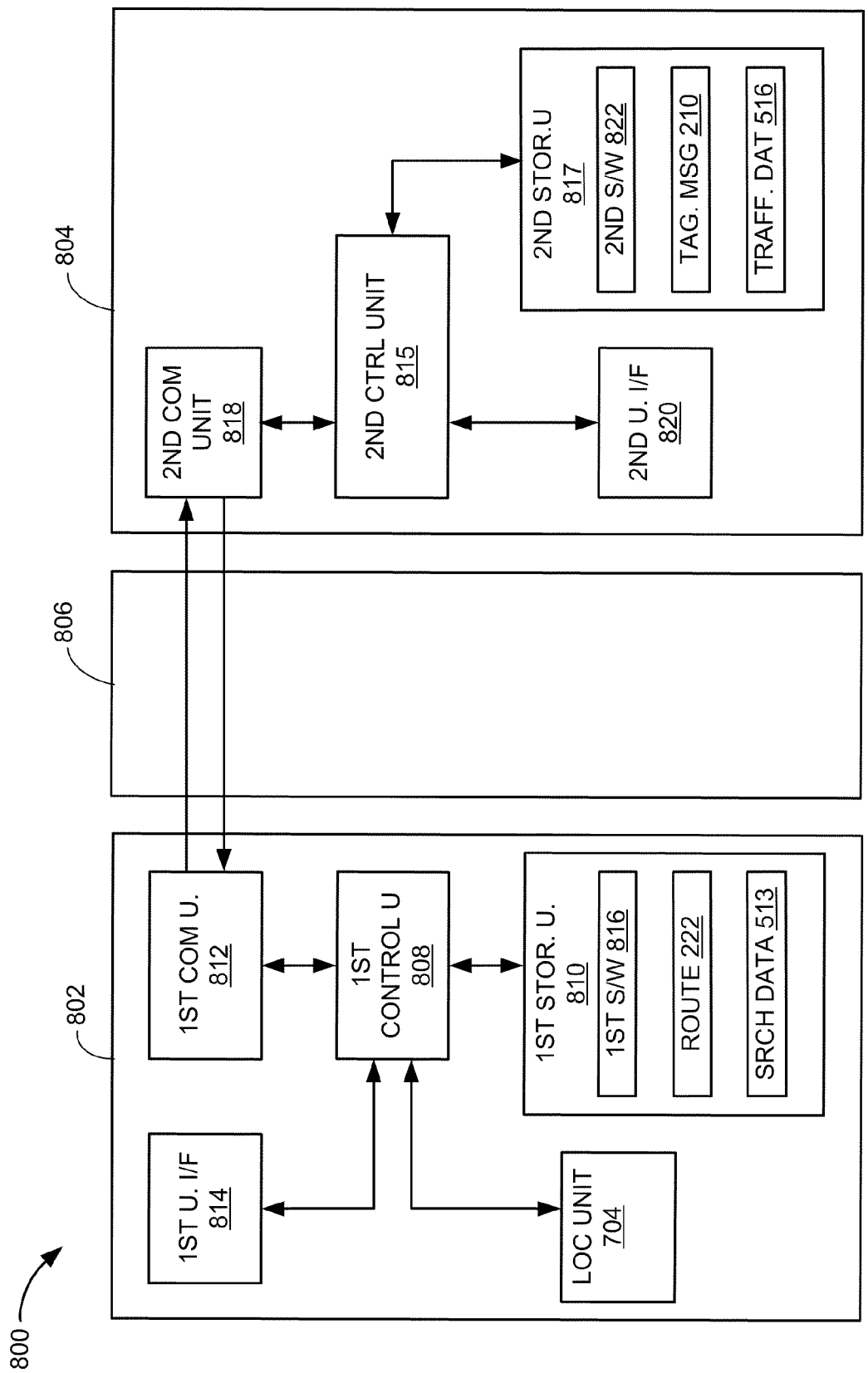
FIG. 8 is a block diagram of a location based system with location-enabled messaging in a third embodiment of the present invention.

Referring now to FIG. 8, therein is shown a block diagram of a location based system 800 with location-enabled messaging in a third embodiment of the present invention. The location based system 800 can include a first device 802, a second device 804, and a communication path 806. The first device 802 can communicate with the second device 804 over the communication path 806.

For illustrative purposes, the location based system 800 is shown with the first device 802 as a client, although it is understood that the location based system 800 can have the first device 802 as a different type of device. For example, the first device 802 can be a server. Also for illustrative purposes, the location based system 800 is shown with the second device 804 as a server, although it is understood that the location based system 800 can have the second device 804 as a different type of device. For example, the second device 804 can be a client.

As a further example, the first device 802 can be a particularized machine, such as a portable computing device, a thin client, a notebook, a netbook, a smartphone, a personal digital assistant, or a cellular phone, and as specific examples, an Apple iPhone™, Palm Centro™, or Moto Q Global™. Yet another example, the second device 804 can be a particularized machine, such as a mainframe, a server, a cluster server, a rack mounted server, or a blade server, or as more specific examples, an IBM System z10™ Business Class mainframe, or a HP ProLiant ML™ server.

For brevity of description for this embodiment of the present invention, the first device 802 will be described as a client device and the second device 804 will be described as a server device. The present invention is not limited to this selection for the type of devices. The selection is an example of the present invention.

The first device 802 can include, for example, a first control unit 808, such as a processor, a first storage unit 810, a first communication unit 812, the location unit 704, and a first user interface 814. For illustrative purposes, the location based system 800 is shown with the first device 802 described with discrete functional modules, although it is understood that the location based system 800 can have the first device 802 in a different configuration. For example, the first control unit 808, the first communication unit 812 and the first user interface 814 may not be discrete functional modules, but can have one or more of the aforementioned modules combined into one functional module.

The first control unit 808 can execute first software 816 from the first storage unit 810 and provide the intelligence of the first device 802. As an example, the first software 816 can include a portion of the location based system 200 of FIG. 2. The first control unit 808 can operate the first user interface 814 to display information generated by the location based system 800. The first control unit 808 can also execute the first software 816 for the other functions of the location based system 800.

The first storage unit 810 can be implemented in a number of ways. For example, the first storage unit 810 can be a volatile memory, a nonvolatile memory, an internal memory, or an external memory. The first storage unit 810 can include the first software 816, the route 222, and the search data 513.

The first user interface 814 can include an output device and an input device. For example, the output device can include a multimedia display, a projector, a video screen, a speaker, or any combination thereof. Examples of the input device include a keypad, a touchpad, a keyboard, a microphone, or any combination thereof to provide data and command inputs. The first user interface 814 can receive input to the first device 802, such as the destination location 220 of FIG. 2.

The location unit 704 of the first device 802 can determine the location reading 216 of the first device 802. The location unit 704 can be implemented in many ways. For example, the location unit 704 can be a global positioning system (GPS), inertial navigation system, cell-tower location system, accelerometer location system, or any combination thereof.

The first communication unit 812 can include active or passive components, such as microelectronics or an antenna, for interaction with the communication path 806. The first control unit 808 can execute the first software 816 and can provide the intelligence of the first device 802 for interaction with the second device 804, the first user interface 814, the communication path 806 via the first communication unit 812, and interaction to the location unit 704.

The second device 804 can include, for example, a second control unit 815, such as a processor or computer, a second storage unit 817, a second communication unit 818, and a second user interface 820. For illustrative purposes, the location based system 800 is shown with the second device 804 described with discrete functional modules, although it is understood that the location based system 800 can have the second device 804 in a different configuration. For example, the second control unit 815, the second communication unit 818, and the second user interface 820 may not be discrete functional modules, but can have one or more of the aforementioned modules combined into one functional module.

The second storage unit 817 can include second software 822 of the second device 804, the tagged message 210, and the traffic data 516. As an example, the second software 822 can include a portion of the location based system 200. For illustrative purposes, the second storage unit 817 is shown as a single element, although it is understood that the second storage unit 817 can be a distribution of storage elements.

Also for illustrative purposes, the location based system 800 is shown with the second storage unit 817 as a single hierarchy storage system, although it is understood that the location based system 800 can have the second storage unit 817 in a different configuration. For example, the second storage unit 817 can be formed with different storage technologies forming a memory hierarchal system including different levels of caching, main memory, rotating media, or off-line storage.

The second control unit 815 can execute the second software 822 and provide the intelligence of the second device 804 for interaction with the first device 802, the second user interface 820, and the communication path 806 via the second communication unit 818. As an example, the second software 822 can include a portion of the location based system 200.

The first communication unit 812 can couple with the communication path 806 to send information to the second device 804. The second device 804 can receive information from the communication path 806 in the second communication unit 818. The second communication unit 818 can couple with the communication path 806 to send information to the first device 802. The first device 802 can receive information from the communication path 806 in the first communication unit 812.

The functional units of the location based system 800 can operate the modules of the location based system 200. The illustration of FIG. 8 shows the location based system 800 with an example partition of the location based system 200.

The first control unit 808 can execute the first software 816 and can provide the intelligence of the first device 802. The second control unit 815 can execute the second software 822 and can provide the intelligence of the second device 804.

For example, the first control unit 808 can couple to the first user interface 814 to operate the message definition module 302 of FIG. 3, the trigger definition module 306 of FIG. 3, and the target recipient module 308 of FIG. 3. The first control unit 808 can couple to the first communication unit 812 to send the tagged message 210 to the second device 804 over the communication path 806. The second control unit 815 can couple to the second communication unit 818 to receive the tagged message 210 from the first device 802 over the communication path 806. The second control unit 815 can couple to the second storage unit 817 to operate the storage module 304 of FIG. 3. As another example, the second control unit 815 can also couple to the second storage unit 817 and the second user interface 820 to operate the message submission module 202 of FIG. 2.

As mentioned previously, the location unit 704 can operate the location module 214 of FIG. 2. The first control unit 808 can couple to the first storage unit 810 to operate the navigation guidance module 218 of FIG. 2. The first communication unit 812 can send the location reading 216 of FIG. 2 and the route 222 to the second device 804 over the communication path 806. The second communication unit 818 can receive the route 222 and the location reading 216 from the first device 802 over the communication path 806.

The second control unit 815 can couple to the second storage unit 817 to operate the check trigger module 402 of FIG. 4 and the select recipient module 406 of FIG. 4. The second control unit 815 can also operate the select recipient module 406 of FIG. 4 and the message logging module 412 of FIG. 4. The second communication unit 818 can send the selected message 226 of FIG. 2 to the first device 802 over the communication path 806.

The first communication unit 812 can receive the selected message 226 from the second device 804 over the communication path 806. The first control unit 808 can couple to the first user interface 814 to operate the message control module 408 of FIG. 4.

The second control unit 815 can operate the select route module 506 of FIG. 5 and the guidance module 508 of FIG. 5. The second communication unit 818 can send the route 222 and the navigation instruction 224 of FIG. 2 to the first device 802 over the communication path 806. The first communication unit 812 can receive the route 222 and the navigation instruction 224 from the communication path 806.

The first device 802 can operate the search module 510 of FIG. 5 The first control unit 808 can operate the display module 512 of FIG. 5 to present the point of interest information 504 of FIG. 5, the navigation instruction 224 of FIG. 2, or other relevant navigation information, on a display of the first user interface 814.

The second device 804 can operate the traffic module 514 of FIG. 5 to generate the traffic update 502 of FIG. 5. The second device 804 can receive general traffic information, such as the traffic data 516, from another module or device, such as the second user interface 820. The second communication unit 818 can send the traffic update 502 across the communication path 806 to the first device 802. The first communication unit 812 can receive the traffic update 502, and the first control unit 808 can operate the display module 512 of FIG. 5 to present the traffic update 502 on the first user interface 814

For illustrative purposes, the location based system 800 is shown with the search data 513 in the first device 802, and the traffic data 516 on the second device 804, although it is understood that the location based system 800 can include a different partition. For example, the location based system 800 can have the search data 513 in the second device 804, or divided between the first device 802 and the second device 804. Further, the location based system 800 can have the traffic data 516 in the first device 802, or divided between the first device 802 and the second device 804

Also for illustrative purposes, the location based system 800 is shown with the modules of the location based system 200 operated by the first device 802 or the second device 804. It is to be understood that the first device 802 and the second device 804 can operate any of the modules and functions of the location based system 200.

Figure 9:
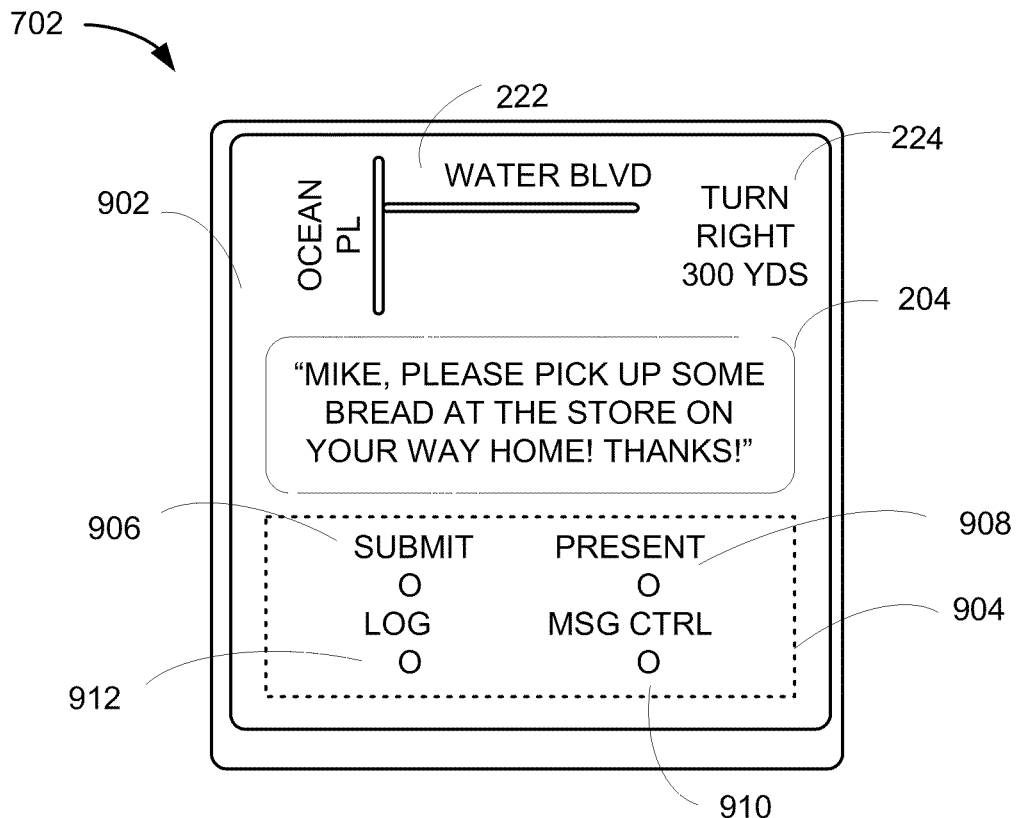
FIG. 9 is an illustration of an example of the location based system of FIG. 7 with location-enabled messaging.

Referring now to FIG. 9, therein is shown an illustration of an example of the location based system 700 of FIG. 7 with location-enabled messaging. The location based system 700 is shown with the user interface 702.

The user interface 702 displays a street map on a multimedia display 902 of the location based system 700, as the location based system 700 traverses the route 222 of FIG. 2. The display shows a street map with turn guidance such as the navigation instruction 224. In this example, the navigation instruction 224 includes an instruction to make a turn after a given distance. The example also shows the names of the streets on the route 222.

The illustration shows the message content 204 of the selected message 226 of FIG. 2. The example is a personal request from user-to-user. For example, as the first device 802 traverses a navigation boundary included with the trigger 206 of FIG. 2, the message management module 212 of FIG. 2 can select the activated trigger 404 of FIG. 4 as the trigger 206. The example shows a request to someone personally known to the submitter of the message.

The illustration also shows a console 904, which can include control inputs on the user interface 702. A submit control 906 on the console 904 can operate the message submission module 202 of FIG. 2. A presentation control 908 can turn on or turn off the presentation of messages, or change the volume of an audio message, or execute other controls for convenience. A message control 910 can enable features such as fast-forward, replay, rewind, or other features for the control of the presentation of the message content 204. A log control 912 can operate the message logging module 412 of FIG. 4 to maintain a message log for the location based system 700.

Figure 10:
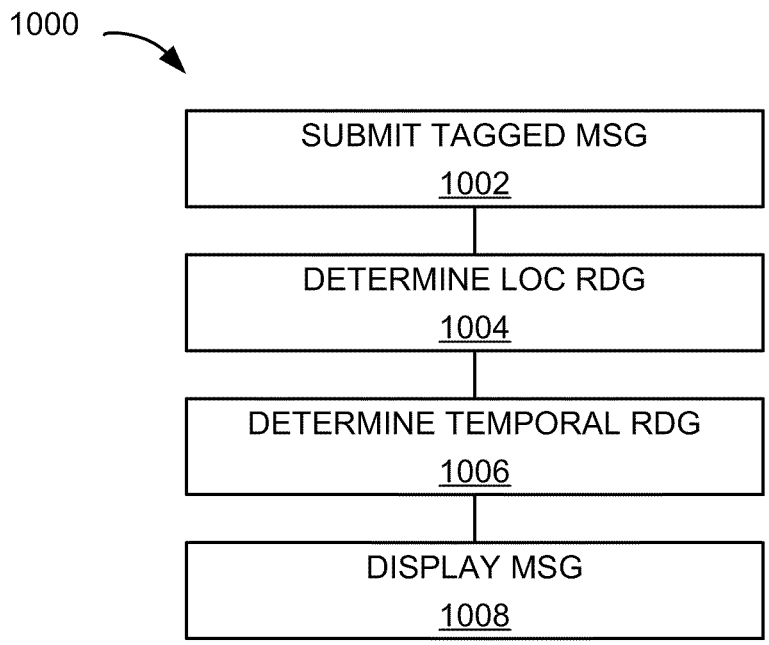
FIG. 10 is a flow chart of a method of operation of the location based system with location-enabled messaging in a further embodiment of the present invention.

Referring now to FIG. 10, therein is shown a flow chart of a method 1000 of operation of the location based system 200 with location-enabled messaging in a further embodiment of the present invention. The method 1000 includes: submitting a tagged message having a message content, a trigger, and a recipient identifier in a module 1002; determining a location reading for locating a recipient associated with the recipient identifier in a module 1004; determining a temporal reading associated with the recipient identifier; and displaying the message content on a device having the recipient identifier, the message content displayed based on the trigger with the location reading, the temporal reading, or a combination thereof in a module 1006.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the location based system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a location based system comprising:
submitting a tagged message having a message content, a trigger, and a recipient identifier with a control unit;
determining a location reading for locating recipients associated with the recipient identifier;
determining a temporal reading associated with the recipient identifier;
comparing the location reading, the temporal reading, or a combination thereof with the trigger for displaying the message content to the recipients when one of the recipients met a condition of the trigger of being inside a navigation boundary for a minimum required time;
assigning the recipient identifier for indicating a first user to arrive at a prearranged destination; and
retaining a presentation duration of the tagged message.

2. The method as claimed in claim 1 further comprising:
selecting the trigger to be an activated trigger based on the location reading and the trigger; and
selecting the tagged message associated with the activated trigger.

3. The method as claimed in claim 1 wherein submitting the tagged message includes assigning the recipient identifier based on a personal familiarity.

4. The method as claimed in claim 1 further comprising selecting another tagged message based on invalid data for the recipient identifier of the tagged message.

5. The method as claimed in claim 1 further comprising logging the message content, the recipient identifier, and the trigger.

6. A method of operation of a location based system comprising:
submitting a tagged messages having message contents, triggers, and a recipient identifier with a control unit;
determining a location reading for locating recipients associated with the recipient identifier;

determining a temporal reading associated with the recipient identifier;

filtering out the tagged message having the recipient identifier as an invalid;

comparing the location reading, the temporal reading, or a combination thereof with the trigger for displaying the message content to the recipients having the recipient identifier as valid when one of the recipients met a condition of the trigger of being inside a navigation boundary for a minimum required time;

assigning the recipient identifier for indicating a first user to arrive at a prearranged destination; and retaining a presentation duration of the tagged message.

7. The method as claimed in claim 6 wherein submitting the tagged message includes specifying the trigger having the location trigger including a location-related condition associated with the recipient identifier.

8. The method as claimed in claim 6 wherein submitting the tagged message includes specifying the trigger having the temporal trigger including a time-related condition associated with the recipient identifier.

9. The method as claimed in claim 6 further comprising selecting a selected message includes generating a recipient identifier request based on the activated trigger.

10. The method as claimed in claim 6 further comprising selecting point of interest information from search data based on the location reading.

11. A location based system comprising:
a control unit coupled to a storage unit and a user interface for submitting a tagged message having a message content, a trigger, and a recipient identifier;
a location unit, coupled to the control unit, for determining a location reading for locating recipients associated with the recipient identifier; and
wherein the control unit is for:
determining a temporal reading associated with the recipient identifier;
comparing the location reading, the temporal reading, or a combination thereof with the trigger for displaying the message content to the recipients when one of the recipients met a condition of the trigger of being inside a navigation boundary for a minimum required time;
assigning the recipient identifier for indicating a first user to arrive at a prearranged destination; and
retaining a presentation duration of the tagged message.

12. The system as claimed in claim 11 wherein the control unit is for:
selecting the trigger to be an activated trigger based on the location reading and the trigger; and
selecting the tagged message associated with the activated trigger.

13. The system as claimed in claim 11 wherein the control unit coupled to the storage unit and the user interface is for assigning the recipient identifier based on a personal familiarity.

14. The system as claimed in claim 11 wherein the control unit coupled to the user interface is for selecting another tagged message based on invalid data for the recipient identifier of the tagged message.

15. The system as claimed in claim 11 wherein the control unit coupled to the storage unit is for logging the message content, the recipient identifier, and the trigger.

16. The system as claimed in claim 11 wherein the control unit is for:
filtering the tagged message having the recipient identifier as an invalid; and
comparing the location reading, the temporal reading, or a combination thereof with the trigger for displaying the message content to the recipients having the recipient identifier as valid when one of the recipients met a condition of the trigger.

17. The system as claimed in claim 16 wherein the control unit coupled to the user interface is for specifying the location trigger including a location-related condition of a device associated with the recipient identifier.

18. The system as claimed in claim 16 wherein the control unit coupled to the user interface is for specifying the temporal trigger including a time-related condition of the device associated with the recipient identifier.

19. The system as claimed in claim 16 wherein the control unit coupled to the storage unit is for generating a recipient identifier request based on the activated trigger.

20. The system as claimed in claim 16 wherein the control unit coupled to the user interface and the communication unit is for selecting point of interest information from search data, based on the location reading.

* * * * *